(12) United States Patent
Cliffe et al.

(10) Patent No.: US 10,253,238 B2
(45) Date of Patent: Apr. 9, 2019

(54) ANTI-ACCRETION ADDITIVES FOR WELLBORE FLUIDS AND METHODS OF USE THEREOF

(71) Applicants: M-I L.L.C., Houston, TX (US); SCHLUMBERGER NORGE AS, Sandnes (NO)

(72) Inventors: Stephen Cliffe, Houston, TX (US); Anders Grinrod, Sandnes (NO)

(73) Assignees: M-I L.L.C., Houston, TX (US); SCHLUMBERGER NORGE AS, Stavanger (NO)

( * ) Notice: Subject to any disclaimer, the term of this patent is extended or adjusted under 35 U.S.C. 154(b) by 30 days.

(21) Appl. No.: 15/349,605

(22) Filed: Nov. 11, 2016

(65) Prior Publication Data

US 2017/0137692 A1    May 18, 2017

Related U.S. Application Data

(60) Provisional application No. 62/255,117, filed on Nov. 13, 2015.

(51) Int. Cl.
| | | |
|---|---|---|
| *C09K 8/36* | (2006.01) | |
| *E21B 21/00* | (2006.01) | |
| *C09K 8/035* | (2006.01) | |
| *C09K 8/52* | (2006.01) | |

(52) U.S. Cl.
CPC ........... *C09K 8/36* (2013.01); *C09K 8/035* (2013.01); *C09K 8/52* (2013.01); *E21B 21/00* (2013.01); *E21B 21/003* (2013.01); *C09K 2208/12* (2013.01); *C09K 2208/28* (2013.01)

(58) Field of Classification Search
None
See application file for complete search history.

(56) References Cited

U.S. PATENT DOCUMENTS

| | | | | |
|---|---|---|---|---|
| 6,054,493 A | * | 4/2000 | Bush | B01F 17/005 516/27 |
| 2006/0096758 A1 | | 5/2006 | Berry et al. | |
| 2008/0287324 A1 | | 11/2008 | Pursley et al. | |

FOREIGN PATENT DOCUMENTS

| | | |
|---|---|---|
| CA | 2437061 A1 | 2/2005 |
| WO | 2009/141308 A1 | 11/2009 |

OTHER PUBLICATIONS

Search Report issued in British Application No. GB1619247.8; dated May 16, 2017 (3 pages).

* cited by examiner

*Primary Examiner* — Jeffrey D Washville
(74) *Attorney, Agent, or Firm* — Osha Liang LLP

(57) ABSTRACT

Accretion inhibiting wellbore fluid compositions a ay contain a multiester, a sorbitan ester surfactant, and a base fluid, wherein the composition is in the form of a metastable emulsion. Methods may include emplacing a wellbore fluid into a wellbore, the wellbore fluid containing a multiester, and a sorbitan ester surfactant, wherein the wellbore fluid forms a metastable emulsion.

20 Claims, No Drawings

ANTI-ACCRETION ADDITIVES FOR WELLBORE FLUIDS AND METHODS OF USE THEREOF

CROSS REFERENCE TO RELATED APPLICATIONS

This application the benefit of U.S. Provisional Application No. 62/255,117 filed on Nov. 13, 2015, incorporated by reference herein in its entirety.

BACKGROUND

During the drilling of a wellbore, various fluids are used in the well for a variety of functions, The fluids may be circulated through a drill pipe and drill bit into the wellbore, and then may subsequently flow upward through wellbore to the surface. During circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

Water-based drilling fluids are often selected for use in a number of hydrocarbon plays, because of the lower associated cost and increased environmental compatibility as compared to oil-based drilling fluids often thought to be the first option in drilling operations. However, other concerns beyond cost effectiveness may also be involved in the selection of wellbore fluids, such as the type of formation through which the well is being drilled. For example, subterranean formations may be at least partly composed of reactive clays, including shales, mudstones, siltstones, and claystones, that swell in the presence of aqueous fluids. While drilling in clay-containing formations, operators may encounter a number of problems encountered that may include bit balling, swelling or sloughing of the wellbore, stuck pipe, and dispersion of drill cuttings into the surrounding wellbore fluid.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments in accordance with the present disclosure are directed to wellbore fluid compositions containing a multiester, a sorbitan ester surfactant, and a base fluid, wherein the composition is in the form of a metastable emulsion.

In another aspect, embodiments in accordance with the present disclosure are directed to methods that may include emplacing a wellbore fluid into a wellbore, the wellbore fluid containing a multiester, and a sorbitan ester surfactant, wherein the wellbore fluid forms a metastable emulsion.

Other aspects and advantages of the invention will be apparent fro wing description and the appended claims.

DETAILED DESCRIPTION

In one aspect, the present disclosure relates to inhibiting accretion of reactive clays and other formation materials in wellbore fluids. Accretion inhibiting compositions of the present disclosure may be formulated as a treatment package that is added to a wellbore fluid or spotted in a wellbore in some embodiments, or formulated as a complete wellbore fluid in other embodiments, When combined with a wellbore fluid, accretion inhibiting components may reduce the occurrence of wellbore instability due to balling, agglomeration, and accumulation of drill cuttings, and in some instances may passivate reactive formation surfaces and reduce fluid loss.

In one or more embodiments, the accretion inhibiting compositions may include a predetermined ratio of one or more multiesters, sorbitan ester surfactants, and oleaginous solvents. Accretion inhibiting compositions in accordance with the present disclosure may also be formulated in some embodiments as a metastable wellbore fluid emulsion or as a treatment package that is combined with an aqueous or oleaginous wellbore fluid in order to produce a metastable emulsion. Further, accretion inhibiting compositions of the present disclosure may also be formulated in some embodiments from components that meet the requirements for use in environmentally sensitive applications.

Accretion inhibiting additives may be beneficial in wellbore operations conducted in formations containing clays and other formation components that form sludges, scales, or other residues when contacted with injected wellbore fluids. When drilling a subterranean well, as the drill bit penetrates the formation, drill chips are generated by the action of the bit. Problems may occur when drilling through clays and other materials that are reactive to components in the drilling fluids. For example, in the absence of drilling fluids, dry clays lack sufficient water for the constituent particles to adhere to each other, creating a region of friable and brittle solids, but may become unstable and mobile when contacted with a circulating aqueous wellbore fluids.

While clay inhibiting compositions may be used to reduce the clay hydration, many times inhibition results in the production of drilling fragments that have sticky and plastic properties. In some instances, these fragments adhere to each other and to the bottomhole assembly and cutting surfaces of the drill bit, gradually forming a large compacted mass of clay on the drilling equipment. This process, or phenomenon, of accumulation and impacting is generally referred to as "balling" or "packing of" of the drilling equipment. Bit balling can adversely impact on drilling operations and reduces the efficiency of the drilling process through a number of mechanisms including slowing the rate of penetration into uncut rock by coating cutting surfaces and reducing wellbore diameter until the drill string becomes locked.

Furthermore, clay swelling and the accompanying increase in bulk volume impacts the stability of the borehole, and impedes removal of cuttings from beneath the drill bit, increases friction between the drill bit and the sides of the borehole, and inhibits formation of the thin filter cake that seals formations. Clay swelling can also create other drilling problems such as loss of circulation or stuck pipe and increased viscosity of the wellbore fluid that slow drilling and increase drilling costs. The downtime associated with either soaking the bit or tripping the bit can be very costly and is therefore undesirable.

In one or more embodiments, accretion inhibiting compositions may include a tailored mixture of multiesters, sorbitan ester surfactants, and oleaginous solvents, which may be combined with a base fluid to produce a wellbore fluid suitable for operations in water-reactive clays. Components in accordance with the present disclosure may also be formulated as a treatment package that is added to existing wellbore fluids prior to or during emplacement in a wellbore without negative effects on rheology or fluid composition, and may provide basic reduction of the coefficient of friction when combined with drilling fluids.

In one or more embodiments, wellbore fluids in accordance with the present disclosure may form a metastable emulsion formed from a secondary liquid phase dispersed within a first. As used herein, "metastable" emulsions are loose emulsions in which the secondary liquid is dispersed in a first liquid, but is relatively unstable (kinetically and/or thermodynamically), when compared to a complete emulsion, and tends to separate from the first liquid over time. For example, after the secondary fluid is dispersed in the first, droplets may begin to coalesce over time and phase separate through sedimentation or creaming. Metastable emulsions in accordance with the present disclosure will at least begin to phase separate by five days following emulsion of the second fluid into the first fluid.

In some embodiments, Metastable wellbore fluids in accordance with the present disclosure may remain as a mixture of phases or metastable for a period of time that may range from a lower limit selected from 15 minutes, 30 minutes, 45 minutes, and 1 hour, to an upper limit selected from 5 hours, 24 hours, 2 days, 7 days, and 1 month, where the time period may range from any lower limit to any upper limit. Here, the time periods are used to describe the time span between mixing all components of the accretion inhibiting composition with as base fluid to form the emulsion, and the time at which the emulsion forms at least two distinct phases. The above time ranges may be more or less depending on the chemical composition of the wellbore fluid and the desired application. In some embodiments, the degree of destabilization of the emulsions and separation into distinct phases may be characterized using standard techniques such as light scattering, focused beam reflectance measurement, centrifugation, and theological measurements.

While the disclosure is not limited by any particular theory of action, it is thought that the metastable emulsion allows surfaces to be contacted to some degree with components from both oleaginous and aqueous phases. In this way, the continuous phase of a wellbore fluid may have qualities similar to both the oleaginous and aqueous phases, providing interfacial access to compounds present in both phases. For example, a metastable oil-in-water emulsion prepared in accordance with the present disclosure may allow oleaginous components in the discontinuous phase to interact with cuttings present in the aqueous phase, reducing clay swelling with greater efficiency. By way of contrast, complete emulsions may isolate the internal phase, limiting the effectiveness of compounds contained therein.

Whether an emulsion of oil and water turns into a "water-in-oil" emulsion or an "oil-in-water" emulsion depends on a number of factors such as the volume fraction of both phases, the type of surfactant present, temperature, and pH. For most emulsions, the Bancroft rule applies, which holds that surfactants tend to produce an internal phase from chemicals and solvents in which they are poorly soluble. The degree of emulsion for a mixed fluid may be tuned from complete emulsion to a metastable emulsion through the selection of the components of the wellbore fluid, particularly by selecting fluid components on the basis of hydrophilicilipophilic balance (HLB). HLB refers to the ratio of the hydrophilicity of a surfactant, due to the presence of polar groups, to the hydrophobicity of the surfactant due to lipophilic groups.

HLB values may be calculated by considering the molecular weight contributions of the respective hydrophilic and lipophilic portions and taking the ratio thereof (divided by 5). A HLB value of 0 corresponds to a completely lipophilicihydrophobic molecule, and a value of 20 corresponds to a completely hydrophilicilipophobic molecule. Broadly, the HLB value may be used to estimate the emulsifying properties of a surfactant. For instance, a HLB value of less than 10 often produces oil-in-water emulsions, whereas a HLB value of greater than 10 may generate an oil-in-water emulsion. For example, surfactants in the range of 0 to 5 are water-insoluble and form water-in-oil emulsions, surfactants in the range of 6 to 9 are partially soluble and are often referred to as wetting agents, surfactants in the range of 10 to 12 form translucent to clear solutions in aqueous fluids and referred to as detergents, and surfactants in the range of 13 to 20 are very water soluble and form oil-in-water emulsions.

In one or more embodiments, wellbore fluids in accordance with the present disclosure may coat metal and cutting surfaces of downhole tools to minimize interaction, reducing shale/steel and shale/shale accretion. In some embodiments, wellbore fluids formulated in accordance with the present disclosure may also eliminate bit balling and enhance the rate of penetration (ROP), even when drilling through formations containing reactive clays or substantial quantities of heavy hydrocarbons and finely divided inorganic solids that may accumulate on tool surfaces or tubulars. Wellbore fluids described herein may also inhibit shale hydration and reduce fluid loss while operating in shale formations containing high concentrations of kaolinite and illite, particularly when drilling using water-based well fluids.

Accretion inhibiting compositions of the present disclosure may be formulated as a wellbore fluid for a variety of applications, including use as a drilling fluid, reservoir drill-in fluid, fracturing fluid, and the like, Compositions may be mixed into the wellbore fluid individually or as a multi-component additive that contains a selected ratio of components. Moreover, accretion inhibiting compositions may be added to the wellbore fluid prior to, during, or subsequent to placing the wellbore fluid in the subterranean formation. Examples of suitable subterranean drilling operations include, but are not limited to, water well drilling, oil/gas well drilling, utilities drilling, tunneling, construction/installation of subterranean pipelines and service lines, and the like. In some embodiments, wellbore fluids in accordance with the present disclosure may also be used to stimulate the fluid production.

Multiester

In one or more embodiments, anti-accretion additives in accordance with the present disclosure may include a multiester that may interact with clay components of the formation, increase the adherence to metal and formation surfaces, and function as a coalescing aid with compatibility with aqueous and oleaginous fluids. In some embodiments, multiesters may also increase the rate of penetration when formulated as a component of a drilling fluid, As used herein, the term "multiester" is used to describe a molecule having two or more carboxylic acid functional groups modified to contain two or more ester bonds to a molecule (or molecules) having one or more alcohol groups.

Multiesters may include one or more multiesters, including esters produced from diacids such as oxalic acid, malonic acid, succinic acid, glutaric acid, adipic acid, pimelic acid, suberic acid, azelaic acid, and sebacic acid; and triacids such as citric acid, and aconitic acid, and the like. Multiesters may be prepared from alcohols that contain alkyl groups, either straight chain or branched chain, containing from about 4 to about 12 carbon atoms including methanol, ethanol, propanol, isopropanol, butanol, isobutanol, phenols, benyl alcohols, and the like.

Multiesters may include esters such as diisobutyl succinate, diisobutyl glutrate, diisobutyl adipate, diisooctyl azelate, diethylhexyl sebacate, diser-amyl sebacate, diisooctyl adipate, diethylhexyl adipate, diethylhexyl azelate, di(1-methyl-4-ethyloctyl) glutarate, diisoamyl adipate, diethylhexyl glutarate, diethylbutyl adipate, ditetradecyl sebacate and diethylhexyl pirate. In some embodiments, multiesters may include COASOL™, commercially available from Dow Chemical Company (Texas City, Tex.), and FLEXI-SOLV®, commercially available from Invista Specialty Intermediates (Wilmington, Del.).

In some embodiments, the HLB of the multiester may be within the range of 7 to 11, or from 8 to 10. In other embodiments, the HLB of the multiester will be selected on the basis of the composition of the fluids being emulsified, where the HLB of the multiester may be selected such that the HLB is slightly (e.g., above or below the target value by 1, 2, or 3) outside of the range that is sufficient to produce a stable emulsion.

Multiesters in accordance with the present disclosure may be used at about 0.1% to about 5% by volume (v %) of wellbore fluid in some embodiments, and from 0.5 v % to 3 v % in other embodiments. However, one of ordinary skill in the art would appreciate that in other embodiments, more or less may be used.

The multiester surfactants may be selected based on the environmental safety constraints in place in the given region in which the wellbore operation takes place, and the average molecular weight ($M_w$) of the sorbitan ester may be greater than 700 Da in some embodiments.

Sorbitan Ester Surfactants

In one or more embodiments, anti accretion additives in accordance with the present disclosure may include a sorbitan ester surfactant, including sorbitan esters produced by the modification of a sorbitan or sorbitan derivatives. In some embodiments, sorbitan ester surfactants selected for an accretion inhibiting composition may produce a metastable emulsion by tuning the emulsifying properties of the surfactant on the basis of overall wellbore fluid composition and wellbore operation in which the fluid will be used.

In one or more embodiments, sorbitan ester surfactants in accordance with the present disclosure may include alkoxylated sorbitan esters in which hydroxyl groups of the sorbitan nucleus are modified to include at least one C8-C22 alkyl or alkenyl ether, such as ethylene glycol, polypropylene glycol, and mixtures, polymers, copolymers, and block copolymers thereof, and a mono-, di-, or tri-esters of C8-C22 alkyl or alkenyl fatty acids. Sorbitan esters may also include sorbitans esterified with mono-, di-, tri-, or tetra-esters of C8-C22 alkyl or alkenyl fatty acids, such as sorbitan monolaurate, sorbitan dialurate, sorbitan monopalmitate, sorbitan dipalmitate, sorbitan monooleate, sorbitan dioleate, etc. Sorbitan ester surfactants may also be a polysorbate, such as polyoxyethylene (20) sorbitan monolaurate, polyoxyethylene (20) sorbitan monoplamitate, polyoxyethylene (20) sorbitan monooleate, and polyoxyethylene (20) sorbitan monostearate. In some embodiments, sorbitan esters may include Span™ 40, Span™ 80, and Tween™ 80 nonionic surfactant commercially available from Croda. International.

In one or more embodiments, the HLB of the sorbitan ester surfactant may be selected such that the HLB value falls in the range of 7 to 9.5, or in the range of 12.5 to 20.

The total concentration of sorbitan ester surfactant and multiester combined may be in the range of 2.5 to 40 ppb (15 to 120 g/L) in some embodiments, and from 5 to 30 ppb in other embodiments. However, one of ordinary skill in the art would appreciate that in other embodiments, more or less may be used.

The sorbitan ester surfactant may be selected based on the environmental safety constraints in place in the given region in which the wellbore operation takes place, and the average molecular weight ($M_w$) of the sorbitan ester may be greater than 700 Da in some embodiments.

Oleaginous Solvent

In one or more embodiments, anti-accretion additives in accordance with the present disclosure may include one or more oleaginous solvents that may form a partial or complete emulsion when contacted with aqueous fluids in or outside of a wellbore.

In one or more embodiments, the solvent may be a glycol ether solvent and may include glycol ethers with 3-5 propylene or ethylene units including tripropylene glycol, diethylene glycol monoethyl ether, dipropylene glycol monomethyl ether, tripropylene glycol monomethyl ether, ethylene glycol monobutyl ether, ethylene glycol dibutyl ether, diethylene glycol monoethyl ether, diethyleneglycol monomethyl ether, tripropylene butyl ether, dipropylene glycol butyl ether, diethylene glycol butyl ether, butylcarbitoi, dipropylene glycol methyl ether, propylene glycol n-propyl ether, propylene glycol t-butyl ether, and the like. In one or more embodiments, solvent may include branched ester solvents such as carboxylic esters of C1 to C10 acids prepared from C3 to C10 alcohols of varying degrees of branching. Branched ester solvents may include, for example, 2-ethyl hexyl acetate, 2-ethyl butyl acetate, 2-pentyl ethyl hexanoate, and the like.

In one or more embodiments, glycol ether solvents in accordance with the present disclosure may have a HLB in the range of 2 to 5 in some embodiments, and from 3 to 4 in other embodiments.

In one or more embodiments, surfactants of the present disclosure may include a surfactant blend that is mixed in ratios of sorbitan ester:multiester:oleaginous solvent in the range of 1:2:2 to 1:6:6. In some embodiments, the ratio of sorbitan ester:multiester:oleaginous solvent surfactant may be 1:3:3 to 1:5:5, where the ratio of multiester to solvent may be varied independently to one another in the described ratio ranges.

In one or more embodiments, the field concentration of an anti-accretion additive package in accordance with the present disclosure may be added to a wellbore fluid at a concentration of 0.1 v % to 10 v % of the wellbore fluid in some embodiments, and from 0.5 v % to 8 v % in other embodiments. However, care must be taken in selecting a particular range for a given wellbore fluid because the addition of excess surfactant may result in the formation and stabilization of emulsions.

Wellbore Fluids

Wellbore fluids may contain a base fluid that is entirely aqueous base or contains a full or partial oil-in-water or water-in-oil emulsion. In some embodiments, the wellbore fluid may be any water-based fluid that is compatible with the accretion inhibiting compositions disclosed herein. In some embodiments, the fluid may include at least one of fresh water, mixtures of water and water soluble organic compounds and mixtures thereof.

In various embodiments, the wellbore fluid may contain a brine such as seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, lithium, and salts of chlorides, bromides, carbonates, iodides, chlorates, bromates, formates, nitrates, oxides, sulfates, phosphates, silicates and fluorides. Salts that may be incorporated in a given brine include any one or more of those present in natural seawater or any other organic or inorganic dissolved salts. Additionally, brines that may be used in the drilling fluids disclosed herein may be natural or synthetic, with synthetic brines tending to be much simpler in constitution. One of ordinary skill would appreciate that the above salts may be present in the base fluid or may be added according to the method disclosed herein. Further, the amount of the aqueous based continuous phase should be sufficient to form a water based drilling fluid. This amount may range from nearly 100% of the wellbore fluid to less than 30% of the wellbore fluid by volume. In some embodiments, the aqueous based continuous phase may constitute from about 95 to about 30% by volume or from about 90 to about 40% by volume of the wellbore fluid.

Wellbore fluids in accordance with the present disclosure may also include oleaginous base fluids such as natural or synthetic oils, including diesel oil, mineral oil, hydrogenated and unhydrogenated olefins including polyalpha olefins, linear and branch olefins and the like, polydiorganosiloxanes, siloxaries, or organosiloxanes, esters of fatty acids, specifically straight chain, branched and cyclical alkyl ethers of fatty acids, mixtures thereof, and similar compounds known to one of skill in the art.

Although a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of army of the claims herein, except for those in which the claim expressly uses the words 'means for' together with an associated function.

What is claimed is:

1. A wellbore fluid composition comprising:
a multiester,
a sorbitan ester surfactant, and
a base fluid;
wherein the composition is in the form of a metastable emulsion and a total concentration of the sorbitan ester surfactant and the multiester ranges from 2.5 to 40 ppb.

2. The wellbore fluid composition of claim 1, wherein the metastable emulsion separates within a time selected from the range of 5 minutes to 1 hour after mixing the multiester, the sorbitan ester surfactant, and the oleaginous solvent components with the base fluid.

3. The wellbore fluid composition of claim 1, further comprising an oleaginous solvent.

4. The wellbore fluid composition of claim 3, wherein the ratio of sorbitan ester:multiester:oleaginous solvent surfactant ranges from 1:3:3 to 1:5:5.

5. The wellbore fluid composition of claim 3, wherein the HLB of the oleaginous solvent is in the range of 2 to 5.

6. The wellbore fluid composition of claim 1, wherein the concentration of the multiester is in the range of 0.5 v % to 3 v %.

7. The wellbore fluid composition of claim 1, wherein the multiester has a HLB within a range of 7 to 11.

8. The wellbore fluid composition of claim 1, wherein the base fluid is an aqueous fluid.

9. The wellbore fluid composition of claim 1, wherein the base fluid is an oleaginous fluid.

10. The wellbore fluid composition of claim 1, wherein the HLB of the sorbitan ester surfactant is in the range of 7 to 9.5, or in the range of 12.5 to 20.

11. The wellbore fluid composition of claim 1, wherein the total concentration of sorbitan ester surfactant and multiester combined ranges from about 5 to 30 ppb.

12. A method comprising:
emplacing a wellbore fluid into a wellbore, the wellbore fluid comprising:
a multiester, and
a sorbitan ester surfactant,
wherein the wellbore fluid forms a metastable emulsion and a total concentration of the sorbitan ester surfactant and the multiester ranges from 2.5 to 40 ppb.

13. The method of claim 12, wherein the wellbore fluid further comprises an oleaginous solvent.

14. The method of claim 13, wherein the ratio of sorbitan ester:multiester:oleaginous solvent surfactant ranges from 1:3:3 to 1:5:5.

15. The method of claim 13, wherein the HLB of the oleaginous solvent is in the range of 2 to 5.

16. The method of claim 12, further comprising combining the wellbore fluid with an aqueous base fluid prior to emplacement in the wellbore.

17. The method of claim 12, further comprising combining the wellbore fluid with an aqueous base fluid present in the wellbore.

18. The method of claim 12, wherein the metastable emulsion separates within a time selected from the range of 5 minutes to 1 hour after mixing the multiester, the sorbitan ester surfactant, and the oleaginous solvent components with a base fluid.

19. The method of claim 12, wherein the HLB of the sorbitan ester surfactant is in the range of 7 to 9.5, or in the range of 12.5 to 20.

20. The method of claim 12, wherein the total concentration of sorbitan ester surfactant and multiester combined may be in the range of 5 to 30 ppb.

* * * * *